United States Patent [19]
Chimenti

[11] Patent Number: 6,000,594
[45] Date of Patent: *Dec. 14, 1999

[54] RACK HITCH MOUNT

[75] Inventor: Thomas A. Chimenti, Fairfield, Conn.

[73] Assignee: Industri AB Thule

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,119

[22] Filed: Jun. 13, 1997

Related U.S. Application Data

[60] Provisional application No. 60/031,124, Nov. 18, 1996.

[51] Int. Cl.$^6$ .............................. B60R 11/00; B60R 9/00
[52] U.S. Cl. .................... 224/519; 224/488; 224/502; 224/525; 224/530; 224/545; 224/548; 224/553; 224/924
[58] Field of Search .............................. 224/42.21, 42.28, 224/545, 548, 553, 565, 917.5, 924, 403, 405, 519, 488, 489, 502, 525, 530; 414/462

[56] References Cited

U.S. PATENT DOCUMENTS

| | | |
|---|---|---|
| 2,676,720 | 4/1954 | Noble . |
| 2,685,913 | 8/1954 | Schlueter . |
| 3,301,421 | 1/1967 | Lutters . |
| 3,877,622 | 4/1975 | McLain . |
| 3,894,643 | 7/1975 | Wilson . |
| 4,298,151 | 11/1981 | O'Connor . |
| 4,400,129 | 8/1983 | Eisenberg et al. . |
| 4,573,854 | 3/1986 | McFarland . |
| 4,676,413 | 6/1987 | Began et al. . |
| 4,676,414 | 6/1987 | Deguevara . |
| 4,682,749 | 7/1987 | Sträter . |
| 4,887,754 | 12/1989 | Boyer et al. . |
| 5,042,705 | 8/1991 | Johansson . |
| 5,050,785 | 9/1991 | Hays . |
| 5,056,700 | 10/1991 | Blackburn et al. . |
| 5,092,503 | 3/1992 | Cocks . |
| 5,094,373 | 3/1992 | Lovci . |
| 5,096,102 | 3/1992 | Tolson . |
| 5,108,018 | 4/1992 | Spinka . |
| 5,181,822 | 1/1993 | Allsop et al. . |
| 5,190,195 | 3/1993 | Fullhart et al. . |
| 5,195,670 | 3/1993 | Piretti et al. . |
| 5,209,628 | 5/1993 | Hassell . |
| 5,232,135 | 8/1993 | Marren . |
| 5,303,857 | 4/1994 | Hewson . |
| 5,330,084 | 7/1994 | Peters . |

(List continued on next page.)

FOREIGN PATENT DOCUMENTS

| | | |
|---|---|---|
| 2689468 | 10/1991 | France . |
| 9309975 | 5/1993 | WIPO . |

*Primary Examiner*—David J. Walczak
*Assistant Examiner*—Timothy L. Maust
*Attorney, Agent, or Firm*—Royston, Rayzor, Vickery, Novak & Druce, L.L.P.

[57] ABSTRACT

A load carrier mountable upon a transporting vehicle having an extension member for positioning an article carried upon the load carrier away from the transporting vehicle. The extension member has a vehicle engaging end that is coupleable to the transporting vehicle and a supporting end substantially opposite the vehicle engaging end upon which an upwardly extending support assembly is connected. The support assembly has an upright post fixed to the extension member and an upright support member coupled to the extension member for relative pivotal movement between the upright post and the upright support member. A collar is slidingly engagable upon the upright support member for releasably securing the upright support member to the upright post thereby establishing a traveling orientation of the load carrier. The collar has a tightener for orienting the collar between an expanded configuration that permits relative sliding movement between the collar and the upwardly extending support assembly and a constricted configuration that prevents relative sliding movement between the collar and the upwardly extending support assembly.

21 Claims, 2 Drawing Sheets

U.S. PATENT DOCUMENTS

| | | |
|---|---|---|
| 5,372,287 | 12/1994 | Deguevara . |
| 5,373,978 | 12/1994 | Buttchen et al. . |
| 5,381,939 | 1/1995 | Tippets . |
| 5,449,189 | 9/1995 | Hirschfeld . |
| 5,469,997 | 11/1995 | Carlson . |
| 5,476,202 | 12/1995 | Lipp . |
| 5,497,927 | 3/1996 | Peterson . |
| 5,518,159 | 5/1996 | DeGuevara . |
| 5,526,971 | 6/1996 | Despain . |
| 5,527,146 | 6/1996 | Allsop et al. . |
| 5,529,231 | 6/1996 | Burgess . |
| 5,549,231 | 8/1996 | Fletcher et al. . |

RACK HITCH MOUNT

This application claims the benefit under 35 U.S.C. 119(e) of U.S. Provisional Application No. 60/031,124 filed Nov. 18, 1996.

FIELD OF THE INVENTION

This invention relates generally to vehicularly mounted load carriers. More specifically, it relates to sport rack carriers configured for attachment to a transporting vehicle at a trailer hitch connection.

BACKGROUND OF THE INVENTION

Carriers for sporting equipment are well known in the industry and are used for transporting pieces of sport equipment to remote locations for use. One such instance is carriers for bicycles that mount upon passenger vehicles. A preferred location for mounting such racks is at the rear of the vehicle where the rack causes minimum distraction and does not obstruct a driver's view. Many vehicles have tailgates that lower and back windows that raise; examples of such vehicles are station wagons, pick-up trucks and many sport utility vehicles. It is also common for such vehicles to have trailer hitch receptacles or receivers located proximate to the bumper structure below these gates. A common configuration for such receivers is a rectangular receptacle intended for a balled assembly to be inserted and fixed therein. It is upon this balled assembly that a trailer may be hitched. When such a balled assembly is not needed, it may be removed in many designs. When removed, the rectangular receiver is vacant and often covered with a removable cap.

Sport rack carrier designers have taken advantage of the presence of such a receiver and designed sports racks to be mounted therein at times when the vehicle is not being used for towing purposes and the receiver is vacant. One particularly popular embodiment in such a rack is in the form of a bicycle carrier.

Such hitch mounted bicycle carriers are known in the industry. One example is found in U.S. Pat. No. 5,529,231 issued to Burgess for an Adjustable Car Carrier on Jun. 25, 1996. In that invention, an upright post is journalled to a horizontal extension to the hitch receiver. Typical carrier systems of known designs incorporate a hinged configuration so that the primary upright structure may be folded downward to facilitate the opening and closing of an adjacently located tailgate. During transport and travel, however, the carrier must be fixed in an upright orientation for proper carriage of the sports equipment resting thereon.

A common means for fixing the upright orientation and preventing outward folding of the upright member is a pinned locking mechanism. This pinned configuration provides a simple means for fixing relative movement between the two pieces of the carrier assembly, but it does not provide a particularly strong connection nor one that is rattle free. Furthermore, it is possible for these pinned connections to be inadvertently disengaged. As a result, the need for an improved system for securing a hinged member of such a hitch mounted rack and preventing its inadvertent disengagement has been recognized as desirable and the present invention has been designed in answer thereto.

SUMMARY OF THE INVENTION

This invention includes features and/or components that have been invented and selected for their individual and combined benefits and superior performance as a load carrier. The system includes multiple components that individually and singularly have new and novel features in and of themselves. Each of the individual components, however, work in association with, and are optimally mated to the others to perform superiorly as a hitch mounted load carrier.

It has been recognized that the pinned method for securing the upright orientation of the carrying post or upright support member lacked security and could eventually wallow-out through use so that the securement between the vertical and horizontal members of the carrier loosens and becomes less secure. The present invention remedies these detrimental effects by providing a common collar that surrounds both a permanently upright post that is secured to the horizontal member and the pivotable upright post that is pivotally coupled thereto. In use, the collar is commonly installed over both of the upright members so each is constrained proximate to the other and in a substantially upright and usually parallel orientation. To prevent the collar from becoming disengaged from the upright members until intended, a securement assembly has been incorporated onto the permanent upright post. Outwardly biased, but depressible buttons are utilized that extend outside the post above an installed collar so that the collar can not back off of the post with out the buttons being intentionally depressed into the post by the operator.

By providing a tightening means for reducing the interior size of the collar, a clamping mechanism is established that is easily imposed and released upon the upright members for securing them in this travel orientation. Because the degree of tightening is variable based on the degree of rotation exerted upon a tightening bolt, any play that develops in the connection may be compensated for throughout the life of the load carrier. Still further, by the two-receiver design of the collar, it is possible to slide the collar up and down the longer of the two upright posts into and out of engagement with the stationary post that fixes the upright orientation.

By making the fit of the collar snug about the upright support on which it slides, the relative location of the collar thereupon remains stable until manually relocated between expanded and constricted configurations. Not only does this assist the operator when changing configurations of the carrier, but it also helps prevent misplacement of the collar that can result from being disengaged from the primary structure of the carrier. By having the connection between the collar and the carrier being frictional in nature, however, purposeful removal of the collar is facilitated when the carrier is to be assembled and disassembled. This feature is complimented by the securement assembly that utilizes the depressible buttons for preventing inadvertent disengagement of the collar from the elongate member or post.

Referring now to specific embodiments of the load carrier or rack hitch mount of the present invention, additional benefits and advantageous features will be appreciated. In at least one exemplary embodiment, the present invention takes the form of a load carrier mountable upon a transporting vehicle having an extension member for positioning an article carried upon the load carrier away from the transporting vehicle. The extension member has a vehicle engaging end that is coupleable to the transporting vehicle and a supporting end substantially opposite the vehicle engaging end upon which an upwardly extending support assembly is connected. The support assembly has an upright post fixed to the extension member and an upright support member coupled to the extension member for relative pivotal movement between the upright post and the upright support member. A collar is slidingly engagable upon the upright support member for releasably securing the upright support member to the upright post thereby establishing a traveling orientation of the load carrier. The collar has a tightener for orienting the collar between an expanded configuration that permits relative sliding movement between the collar and the upwardly extending support assembly and a constricted configuration that prevents relative sliding movement between the collar and the upwardly extending support assembly.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DESCRIPTION OF THE DRAWINGS AND ILLUSTRATIVE PHOTOGRAPHS

DESCRIPTION OF THE INVENTION

Figure 1:
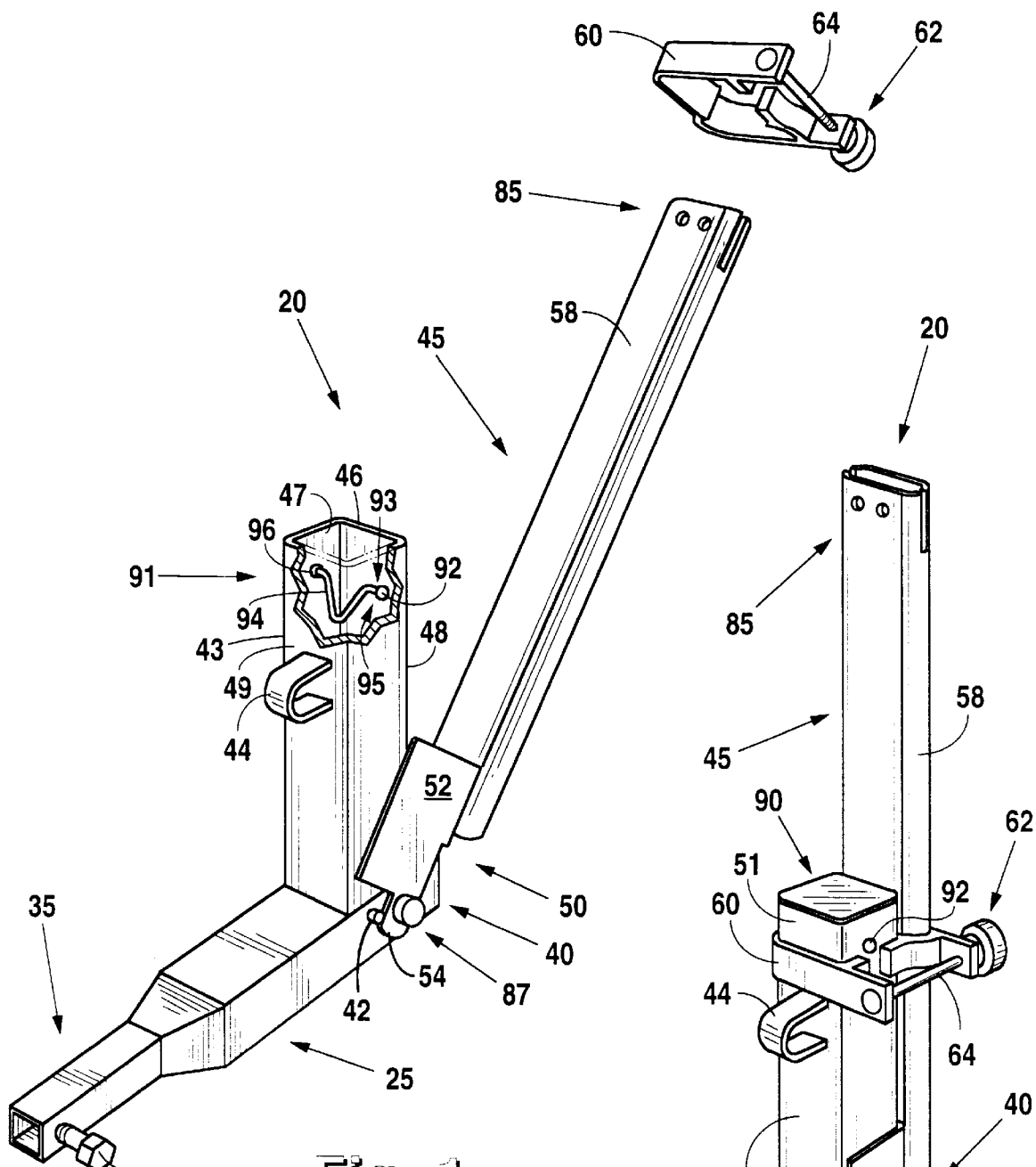
FIG. 1 is an exploded perspective view showing the present invention in an open or laid-back configuration for accommodating the opening of an adjacent tailgate.
Figure 2:
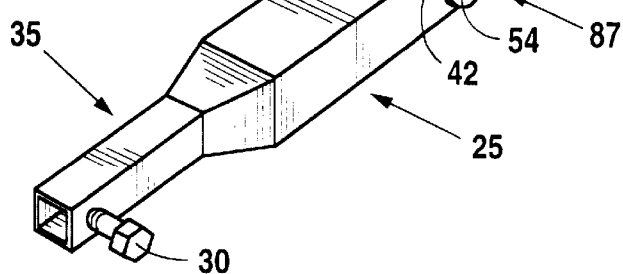
FIG. 2 is an assembled perspective view of the present invention with the upright member secured by the collar in an upright orientation and the depressible securing buttons extended.
Figure 3:
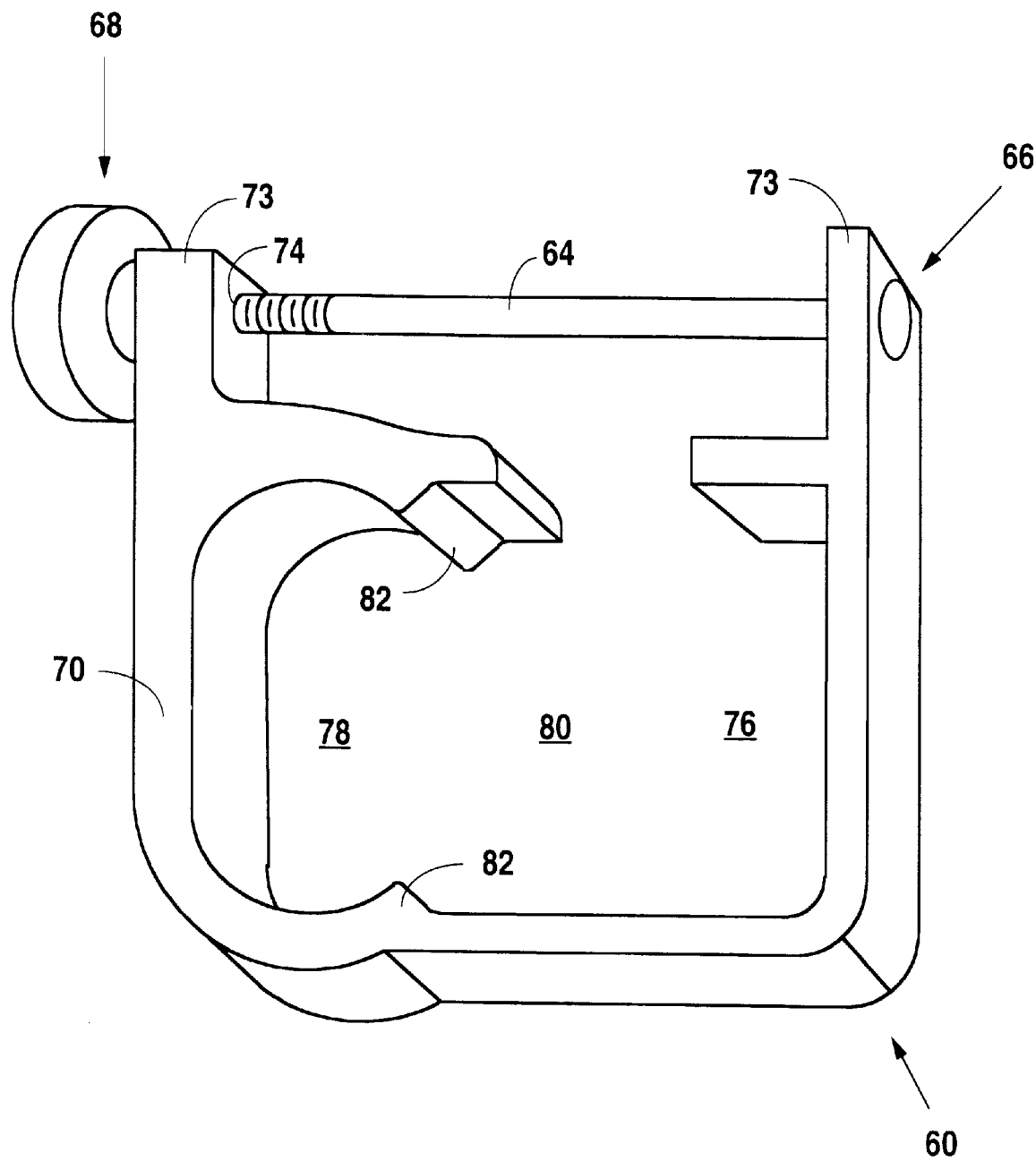
FIG. 3 is a perspective view of the collar of the present invention.

As required, detailed embodiments of the present invention are disclosed herein; however, it is to be understood that the disclosed embodiments are merely exemplary of the invention that may be embodied in various and alternative forms. The Figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

Certain terminology will be used in the following description for convenience and reference only and not for purposes of limitation. For example, the words "rightwardly", "leftwardly", "upwardly" and "downwardly" will refer to directions in the drawings to which reference is made. The words "inwardly" and "outwardly" refer to directions toward and away from, respectively, the geometric center of the structure being referred to. This terminology includes these words, specifically mentioned derivatives thereof, and words of similar import.

Furthermore, elements may be recited as being "coupled"; this terminology's use anticipates elements being connected together in such a way that there may be other components interstitially located between the specified elements, and that the elements may be connected in fixed or movable relation one to the other. Certain components may be described as being adjacent to one another. In these instances, it is expected that such a relationship so described shall be interpreted to mean that the components are located proximate to one another, but not necessarily in contact with each other. Normally there will be an absence of other components positioned therebetween, but this is not a requirement. Still further, some structural relationships or orientations may be designated with the word "substantially". In those cases, it is meant that the relationship or orientation is as described, with allowances for variations that do not effect the cooperation of the so described component or components.

As discussed above, a primary drawback of current hitch mount carrier designs is the utilization of a pinned locking mechanism for fixing the upright member relative to the horizontal support member. As a replacement for the function of such a pin, the present invention utilizes an article taking the form of a tightenable collar 60 that surrounds two upright components and fastens them snugly together into a traveling or transport configuration. In the illustrated embodiment, the collar 60 encircles both an upright post 43 in the form of an elongate member that is mounted upon an extension member 25 or in the form a horizontal hitch engaging member and an upright support member 58 of an upwardly extending support assembly 45.

The load carrier or rack hitch mount 20 of the present invention has as two primary structural components; the extension member 25 that is substantially horizontally oriented and the upwardly extending support assembly 45 that is normally substantially vertically oriented and which are connected together by a hinge assembly 87. The hinge assembly 87 includes a hinge pin 89 that physically connects the two members in relative pivotable orientation. The extension member 25 has an insertable or connectable end 35 that is insertable into a hitch assembly receiver located upon or adjacent to the bumper assembly of a vehicle. In a typical configuration the extension member 25 is fastened to the hitch receiver by a connecting bolt 30 of conventional design. Opposite to the connectable end 35 is hinged end 40 where the vertical support assembly 45 is rotatably or pivotally connected. Proper upright positioning of the upright support member 58 is achieved by the incorporation of a stop button 42 or other projection upon the extension member 25. When the upright support member 58 is in an abutting engagement with the stop button 42, proper upright orientation is assured.

The upright post 43 is connected by a weld in the illustrated embodiment to the extension member 25. The lower hinged end 50 of the support member 58 of the assembly 45 comprises a C-shaped sleeve 52 that fits about the upright post 43 when in an upright orientation. The sleeve includes pinned ears 54 having pin apertures extending therethrough wherein a fixing pin or bolt is inserted for establishing the hinge or pivot connection. Opposite the lower hinged end 50 of the upwardly extending support assembly 45 is an upper carrier engaging end 85 to which equipment load carriers of variable design may be attached.

The tightenable collar 60 is designed to tightly secure the upright support 58 to the upright post 43 in a substantially vertical orientation. The collar 60 is appropriately configured so that its encircling body 70 establishes a subdivided interior space 80 partitioned at least partially by a divider portion 82 that defines an upright post receiver 76 and an upright support member receiver 78. In a preferred embodiment that is illustrated, the collar 60 comprises a single-piece encircling collar body 70. In use, the collar 60 has two primary configurations. One is a loosened, relaxed or expanded configuration wherein relative movement is facilitated between the collar 60 and the upright post 43. The degree of advancement of the collar 60 downwardly upon the post 43 is governed by the position of a looped stop 44 mounted thereupon designed to prevent the collars advancement beyond a predetermined position.

In this expanded configuration, the collar may be urged without undue force along the length of the upright support member 58 upon which the collar 60 frictionally fits. The second configuration is a tightened or constricted configuration wherein a tightener 62 upon the collar 60 is manipulated so that the interior space 80 of each receiver 76,78 is reduced and restricted. As a result, a clamping effect is imposed between the upright post 43 and the upright support member 58 so that the upwardly extending support assembly 45 is established.

The tightener 62 comprises a threaded shaft or bolt 64 that has a manually manipulatable adjustment knob 68 upon one end and which is opposite to a fixed end 66 of the shaft 64. By rotating the knob 68, the tightener 62 may be elongated or constricted. In doing so, the collar 60 is either permitted to expand or is interiorly constricted. When relaxed, a clearance space is established between the collar 60 and the upright post 43 and the upright support member 58 so that urged slipping of the collar on those members 43,58 is facilitated. It is in this configuration that the collar 60 may be raised off of the upright post 43 and the vertical support assembly 45 permitted to fold or pivot outward from the post 43.

Two tightener engaging tabs 73 are provided on opposite sides of the collar 60, each tab having a tightener or shaft receiving aperture 74 therethrough. By inserting the threaded shaft 64 through those apertures 74, fixing one end 66 to one tab 73 and connecting the opposite end of the shaft 64 to the adjustment knob 68, loosening and tightening of the collar 60 is achieved as a result of inward axial pressure being exerted by the tightener 62 upon the tabs 73. Under the pressure of the tightener 62, the body 70 of the collar 60 may be elastically deformed to an extent that tight abutting engagement is experienced between the several components, namely the collar 60, the upright post 43 and the vertical support member 58 resulting in their being held together in an upright orientation.

The rack hitch mount 20 is constructed in the preferred embodiment predominately from rectangular tubular steel. To facilitate and provide an appealing appearance, open ends of rack components constructed from such tubular steel are covered by end caps 90. As a result, a more visually appealing product is provided.

In one embodiment and that which is illustrated, the present invention takes the form of a securement assembly 91 for releasably securing an article to an elongate member 43 of a rack hitch mount 20 or load carrier that is mountable upon a transporting vehicle. In the illustrated embodiment, the elongate member 43 is the upright post 43. The elongate member 43 of the securement assembly 91 is adapted to slidably receive an article, and more specifically the collar 60 thereupon in an orientation in which the collar 60 at least partially surrounds the upright post 43 or elongate member. The upright post 43 has a receiving portion 49 and an extension portion 51, each portion 49,51 being established when the collar 60 is engaged about the elongate member 43 in a secured configuration. A depressible securing button 92 is located at the extension portion 51 and depressibly projects outwardly from the extension portion 51 for preventing unintended disengagement of the collar 60 from the upright post 43. In at least one embodiment of the securement assembly 91, the depressible securing button 92 extends through a wall 46 of the upright post 43 with a rear portion 93 of the depressible securing button 92 being located at an interior 47 of the upright post 43 and a protruding portion 95 of the depressible securing button 92 being located outside an exterior surface 48 of the upright post 43 when the depressible securing button 92 is in an extended configuration.

A biasing member 94 is coupled to the depressible securing button 92 for urging the depressible securing button 92 to an extended configuration that prohibits disengagement of an engaged article from the upright post 43. In one embodiment, the biasing member 94 is a compressible spring located at least partially within the interior portion 47 of the upright post 43. In the embodiment shown, the compressible spring 94 is located entirely within the interior portion 47 of the upright post 43 and takes the form of a substantially u-shaped flexible metal strap.

Optionally, there is a second depressible securing button 96 positioned at a second location upon the extension portion 51 that also depressibly projects outwardly from the extension portion 51 for preventing unintended disengagement of the engaged article or collar 60 from the upright post 43. The second depressible securing button 96 is positioned substantially opposite to the depressible securing button 92 across the upright post 43. When the second button 96 is present, the biasing member or spring 94 is coupled between the two buttons 92,96 for urging both to an extended configuration that prohibits disengagement of an installed collar 60 from the upright post 43.

The fixed stop 44 or loop is located upon the upright post 43 for abutting the collar 60 so that the collar 60 is positioned at least partially about the receiving portion 49 of the upright post 43 when in the secured configuration. As specified above, in this embodiment the upright post 43 is the upright post of the hitch mountable load carrier.

The description herein is intended to be exemplary in nature. A primary beneficial characteristic of the presently disclosed invention is the provision of a tightenable collar that secures and maintains the rack hitch mount 20 in an upright carrying configuration until intentionally folded down and open by an operator after first sliding the collar off of the upright post 43 to permit the opening of the carrying vehicle's tailgate.

Still further, it is contemplated that the collar 60 may be used in other environments to secure adjacently located members together in the unique manner disclosed herein. Still further yet, the securement assembly 91 is contemplated to be utilizable at various locations upon a load carrier; not just upon the upright post 43 of the illustrated embodiment.

A hitch mountable load carrier and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said upright support member; and an at least partially encircling collar body engagable about said upright support member and said upright post, said collar body adapted to releasably restrain said upright support member to said upright post.

2. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said upright support member;

a collar slidingly engagable upon said upright support member for releasably securing said upright support member to said upright post thereby establishing a traveling orientation of said load carrier, and said collar having an encircling collar body configured to receive said upright post and said upright support member therein.

3. The load carrier as recited in claim 2; said load carrier further comprising:

said collar having a tightener for orienting said collar between an expanded configuration that permits relative sliding movement between said collar and said upwardly extending support assembly and a constricted configuration that prevents relative sliding movement between said collar and said upwardly extending support assembly.

4. The load carrier as recited in claim 3; said load carrier further comprising:

said collar having an upright support member receiving portion, said upright support member receiving portion configured to frictionally fit about said upright support member in both said expanded and constricted configurations so that said collar remains stationary upon said support member unless purposefully slid thereupon.

5. The load carrier as recited in claim 4; said load carrier further comprising:

said collar having an upright post receiving portion, said upright post receiving portion configured to loosely fit about said upright post in said expanded configuration and to snugly fit about said upright post in said constricted configuration.

6. The load carrier as recited in claim 5; said load carrier further comprising:

said collar having a divider portion subdividing an interior space of said collar into said upright support member receiving portion from said upright post receiving portion.

7. The load carrier as recited in claim 5; said load carrier further comprising:

said tightener comprising a threaded bolt extending between two distanced tabs upon said collar, said threaded bolt being fixed to one tab and extending through a shaft receiving aperture in a second of said two tabs; and an adjustment knob screwably positioned upon said threaded bolt exteriorly to said second tab so that advancement of said knob upon said bolt reconfigures said collar from the expanded configuration to the constricted configuration.

8. The load carrier as recited in claim 5; said load carrier further comprising:

a projecting stop positioned upon said upright post for preventing said collar from sliding there beyond.

9. The load carrier as recited in claim 2; said load carrier further comprising:

said vehicle engaging end of said extension member having an insertable portion configured for insertion within a hitch receiver mounted upon the transporting vehicle; and said insertable portion being joined to said extension member by a tapered neck, said tapered neck flaring outwardly from said insertable portion.

10. The load carrier as recited in claim 9; said load carrier further comprising:

said insertable portion of said extension member having an aperture and a bolt for insertion within said aperture for securing said load carrier to the transporting vehicle.

11. The load carrier as recited in claim 9; said load carrier further comprising:

said insertable portion of said extension member having a smaller cross-sectional size than a balance of said extension member's length for accommodating insertion of said insertable portion into the hitch receiver mounted upon said transporting vehicle; and said balance of said extension member having a cross-sectional size greater than said insertable portion, said balance of said extension member having greater cross-sectional size for increased structural integrity of said load carrier under loaded conditions.

12. The load carrier as recited in claim 11; said load carrier further comprising:

said extension member and said upright post being constructed from tubular steel having a substantially square cross-sectional shape with end caps covering at least one open end of said extension member and an open top end of said upright post.

13. The load carrier as recited in claim 5; said load carrier further comprising:

said upright support member being coupled to said extension member by a pivot connection, said pivot connection comprising a c-shaped sleeve configured for fitting about said upright support member; and said sleeve having ears extending therefrom, said ears pinned to said extension member for pivotal movement relative thereto.

14. The load carrier as recited in claim 13; said load carrier further comprising:

a stop button mounted upon said extension member for engaging said c-shaped sleeve at a predetermined position for limiting the degree of permitted pivotal movement of said upright support member away from said upright post.

15. The load carrier as recited in claim 14; said load carrier further comprising:

said stop button abutting said pinned ears extending upon said sleeve when said predetermined position is reached as said upright support member is pivoted away from said upright post.

16. The load carrier as recited in claim 5; said load carrier further comprising:

a top end of said upright support member being configured for accommodating attachment of an article support assembly upon which articles to be carried on said load carrier are securable.

17. A load carrier mountable upon transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said extension member; and a collar slidingly engagable upon said upright support member for releasably securing said upright support member to said upright post thereby establishing a traveling orientation of said load carrier, said collar having an encircling collar body configured to receive said upright post and said upright support member therein.

18. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said extension member; and a collar slidingly engagable upon said upright support member for releasably securing said upright support member to said upright post thereby establishing a traveling orientation of said load carrier, said collar having a tightener for orienting said collar between an expanded configuration that permits relative sliding movement between said collar and said upwardly extending support assembly and a constricted configuration that prevents relative sliding movement between said collar and said upwardly extending support assembly.

19. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said extension member; and a collar slidingly engagable upon said upright support member for releasably securing said upright support member to said upright post thereby establishing a traveling orientation of said load carrier, said collar having an upright support member receiving portion, said upright support member receiving portion configured to frictionally fit about said upright support member so that said collar remains stationary upon said support member unless purposefully slid thereupon.

20. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said extension member; and a collar slidingly engagable upon said upright support member for releasably securing said upright support member to said upright post thereby establishing a traveling orientation of said load carrier, said collar having an upright post receiving portion, said upright post receiving portion configured to fit about said upright post.

21. A load carrier mountable upon a transporting vehicle, said load carrier comprising:

an extension member for positioning an article carried upon said load carrier away from the transporting vehicle, said extension member having a vehicle engaging end coupleable to the transporting vehicle and a supporting end substantially opposite said vehicle engaging end upon which an upwardly extending support assembly is connected;

said support assembly having an upright post fixed to said extension member and an upright support member coupled to said extension member for relative pivotal movement between said upright post and said extension member; and a collar slidingly engagable upon said support assembly for releasably securing said upright support member to said upright post thereby establishing a traveling orientation of said load carrier; and a projecting stop positioned upon said upright post for preventing said collar from sliding past.

* * * * *